(12) United States Patent
Stall et al.

(10) Patent No.: US 8,271,958 B2
(45) Date of Patent: Sep. 18, 2012

(54) REMAPPING DEBUGGABLE CODE

(75) Inventors: Jonathon Michael Stall, Bothell, WA (US); Anthony L. Crider, Mill Creek, WA (US); Igor A Zinkovsky, Bellevue, WA (US); James Hugunin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 12/333,675

(22) Filed: Dec. 12, 2008

(65) Prior Publication Data

US 2010/0153939 A1 Jun. 17, 2010

(51) Int. Cl.
*G06F 9/44* (2006.01)

(52) U.S. Cl. ........ 717/130; 717/124; 717/126; 717/127; 717/128; 717/129; 714/38.1; 712/244

(58) Field of Classification Search .......................... None
See application file for complete search history.

(56) References Cited

U.S. PATENT DOCUMENTS

| | | | |
|---|---|---|---|
| 6,324,683 B1 * | 11/2001 | Fuh et al. ....................... | 717/124 |
| 6,553,565 B2 | 4/2003 | Click, Jr. et al. | |
| 6,658,656 B1 | 12/2003 | Thompson | |
| 6,760,903 B1 * | 7/2004 | Morshed et al. .............. | 717/130 |
| 6,795,963 B1 | 9/2004 | Andersen et al. | |
| 6,957,422 B2 * | 10/2005 | Hunt ............................ | 717/130 |
| 6,966,057 B2 * | 11/2005 | Lueh ............................ | 717/158 |
| 7,293,259 B1 | 11/2007 | Dmitriev | |
| 7,493,622 B2 * | 2/2009 | Borkan ......................... | 719/310 |
| 2003/0056200 A1 * | 3/2003 | Li et al. ......................... | 717/128 |
| 2005/0028137 A1 * | 2/2005 | Evans et al. ................... | 717/110 |
| 2005/0039171 A1 * | 2/2005 | Avakian et al. ............... | 717/127 |
| 2005/0039172 A1 * | 2/2005 | Rees et al. ..................... | 717/130 |
| 2005/0204348 A1 * | 9/2005 | Horning et al. ................ | 717/140 |
| 2007/0277151 A1 * | 11/2007 | Brunel et al. ................. | 717/113 |
| 2008/0168428 A1 | 7/2008 | Bates et al. | |
| 2008/0306711 A1 * | 12/2008 | Bansal .......................... | 702/182 |
| 2009/0133033 A1 * | 5/2009 | Lindo et al. ................... | 718/108 |

OTHER PUBLICATIONS

Title: Organization and management of distributed execution event histories for real-time debugging, author: Borchert, C.B, dated: 1992, source: IEEE.*
Title: A virtual instrumentation for monitoring induction machines, author: Eren, H, dated: 1998, source: IEEE.*
Brender, et al., "Debugging Optimized Code: Concepts and Implementation on Digital Alpha Systems", Retrieved at <<http://netilium.org/—mad/dtj/DTJ/DTJT07/DTJT07P8.PS>>, Digital Technical Journal, vol. 10, No. 1, 1998, pp. 81-99.

(Continued)

*Primary Examiner* — Chameli Das
(74) *Attorney, Agent, or Firm* — Microsoft Corporation

(57) ABSTRACT

User script code that has been developed for execution in a host application can be remapped to debuggable script code, based on explicit debugging gestures, allowing for appropriate debugging coverage for the code while mitigating execution (in)efficiency issues. Capabilities of an application virtual machine used for the host application can be determined, and the user script code can be instrumented with guards for detecting explicit debugging gestures based on a virtual machine's (VM') capabilities. The instrumented user script code can be executed in a runtime environment, for example, by a just-in-time compilation service. If an explicit debugging gesture is detected, a function where the gesture was detected can be transformed into debuggable script code, in one embodiment, based on the debuggable gesture detected.

20 Claims, 7 Drawing Sheets

OTHER PUBLICATIONS

Berger, et al., "Source-Level Debugging of Optimized Programs using Data Flow Analysis", Retrieved at <<http://wwwbode.in.tum.de/~wismuell/pub/sun92.ps.gz>>, Dec. 4, 1992, pp. 1-21.

Tolmach, et al., "Debugging Standard ML without Reverse Engineering", Retrieved at << http://citeseerx.ist.psu.edu/viewdoc/summary?doi=10.1.1.43.5048 >>, pp. 1-12, Mar. 1990.

Holzle, et al., "Debugging Optimized Code with Dynamic Deoptimization", Retrieved at <<http://www.cs.ucsb.edu/~urs/oocsb/papers/pldi92.pdf>>, ACM SIGPLAN '92, Conference on Programming Language Design and Implementation, San Francisco, Jun. 1992, pp. 1-12.

\* cited by examiner

REMAPPING DEBUGGABLE CODE

BACKGROUND

Users of computer program applications often find a need to perform specific tasks in the application, sometimes over and over again. For example, a company managing their financial issues may wish perform certain calculations on data populating a spreadsheet in an application. Performing these tasks may be supported by a host application, but applications may also allow a developer/user to create custom solutions to automate desired tasks.

A user of an application or a developer can create macros that perform supported functions in the application, thereby automating a desired task. Macros can be created by recording a series of actions the user performs in the application, or can be developed in source code that is supported by the host application. Developers/users may wish to debug a macro, either before use or after detecting undesirable operations of the macro in the host application. Host applications may run on a platform that comprises an implementation of a programming language framework in an integrated development environment (IDE), which enables a user/developer to write source code, compile the code, and debug the code to be run in the host application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

During debugging of their user script code a developer often inserts breakpoints where they can inspect the test environment to determine whether it is functioning as expected. Further, at breakpoints, a developer may wish to inspect variables, step to different functions without executing the code in between, edit code and continue execution, review exception handling, amongst other things. Currently, during most new debugging operations (e.g., using C# and .NET scripting), when the debugger hits a breakpoint in the application (debugee) it causes the debugee to freeze until the debugger is restarted (e.g., when restart is selected by the user). Some older IDE platforms for host applications allow the host application to continue to respond when a breakpoint is hit, which may be desirable. However, if a host application was to move from an older scripting platform to a new scripting platform, a user may not be able to have that host application continue to respond at a debugging breakpoint.

One may enable debuggability of user script code developed for running in a host application by transforming the user script code into debuggable code. For example, the user script code can be instrumented with script code that can make the user script code debuggable, allowing the debugger to get debugging information from the user code instead of from a debugging API that may impact the host application. However, if a user script code were to be fully transformed into debuggable script code the user script code's execution efficiency may be impacted in the runtime environment.

As provided herein, user script code can be remapped to debuggable script code, based on explicit debugging gestures. For example, instead of transforming all of the user script code into debuggable code that incorporates many common debugging features, the user script code can be transformed based on whether debugging is performed and what type of debugging is to be performed.

In one embodiment, where a virtual machine (VM) is utilized for executing the host application in a runtime environment of an application execution and development framework, the VM's capabilities can be determined, such as its functional call speed (e.g., a speed at which calls are made to the CPU for respective functions in a script code) and debugging support services it may provide. Functions in the user script code can be instrumented with one or more guards for detecting an explicit debugging gesture, based on the VM's capabilities. For example, if the functional call speed of the VM is high, more guards may be able to be injected into the user script code.

In this embodiment, the user script code is executed in the runtime environment, for example, by a just-in-time compilation service. If an explicit debugging gesture is detected during execution of the user script code, a user script code function can be transformed into debuggable script code, beginning at a stopping point of the explicit debugging gesture in the function of the user script code. Therefore, for example, a single function or a portion thereof may be transformed into debuggable script code.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
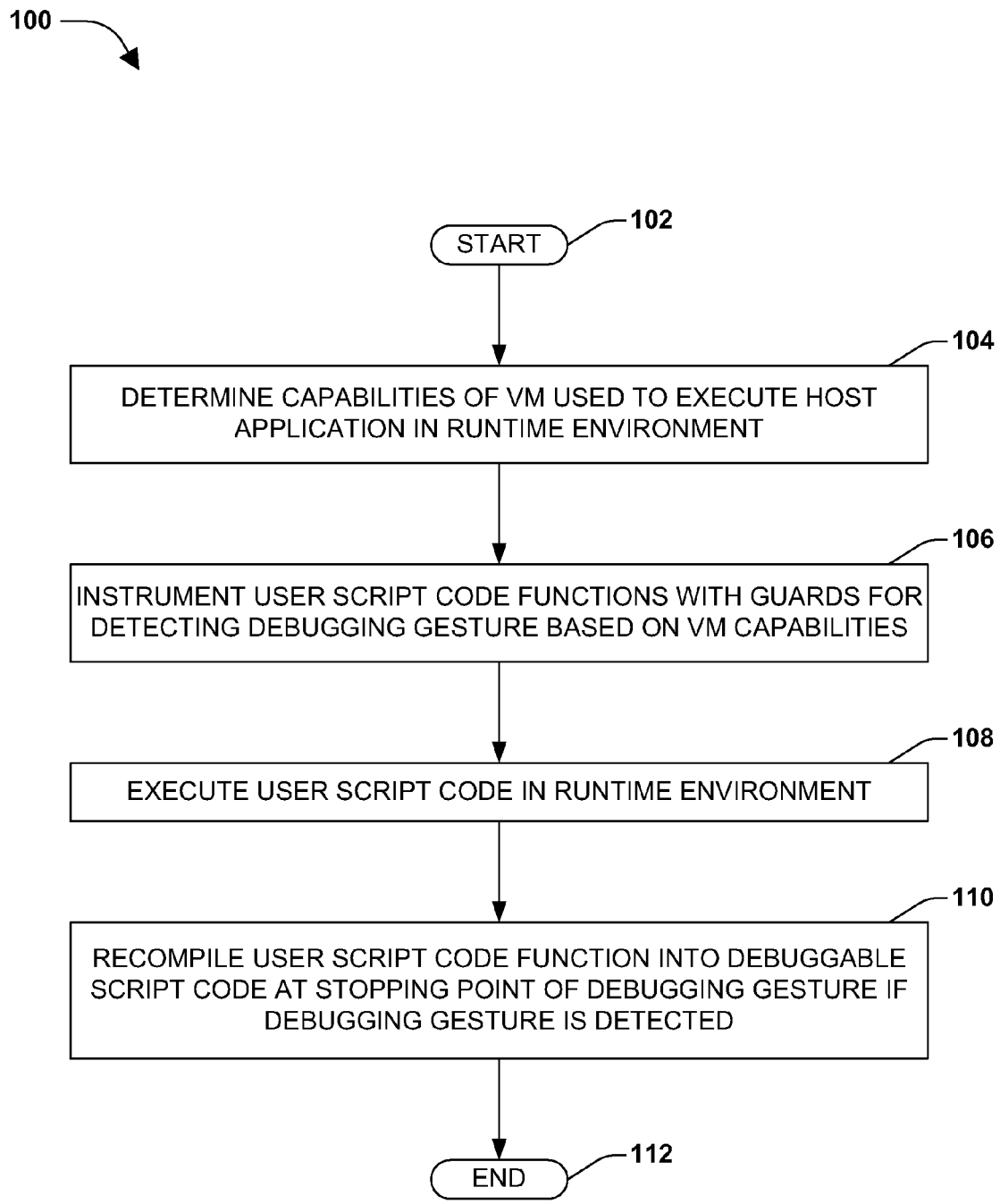
FIG. 1 is a flow chart illustrating an exemplary method of remapping user script code, developed to be run in a host application, to debuggable script code.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 for remapping user script code, which has been developed for running in a host application, to debuggable script code. For example, where a host application may be running in an application execution and development framework (e.g., ".NET", Java, or an integrated platform for a programming language and an integrated development environment (IDE)), user and/or developers of the host application may develop script code that can run automated tasks in the host application (e.g., a macro).

The exemplary method 100 begins at 102 and involves determining capabilities of a virtual machine (VM) that is utilized for executing the host application in a runtime environment of an application execution and development framework, at 104. For example, application execution and development frameworks typically provide an appearance of an application VM (aka process VM) in their runtime environment.

The application VM can provide a platform-neutral application execution environment, allowing an application to execute in a same way on a variety of platforms (e.g., using a just-in-time compilation service (JIT)). Different VMs may provide different capabilities, such a speed of executing calls in code being executed, and support for debugging features. In one embodiment, capabilities of the VM used for the host application may determine a type and/or a number of user script code instrumentations used in the exemplary method 100.

At 106, in the exemplary method 100, respective functions in the user script code are instrumented with one or more guards for detecting an explicit debugging gesture, based on the VM's capabilities. For example, instrumenting guards into the user script code may decrease execution efficiency of the code in the runtime environment. In this example, a functional call speed capability of the VM may be used to determine a number of guards to be injected into the user script code, and may determine where the guards are to be injected.

In one embodiment, for example, more guards can be injected into the user script code for a VM having a faster functional call speed, as the execution efficiency of the code may not be greatly affected. On the other hand, in this embodiment, fewer guards may be injected into the user script code for a VM having a slower functional call speed, as the execution efficiency of the code may be affected if more guards were to be injected in the script. Therefore, in this embodiment, a functional call speed rating of the VM used for the host application can be used to determine the number of guards to be instrumented into the user script code.

It will be appreciated that the techniques described herein are not limited to determining user script code instrumentation based merely on a functional call speed rating of an application VM for the host application. A number, type and location of user code instrumentations can be based on any number of VM capabilities that affect execution efficiency of the host application in the runtime environment, and those skilled in the art may devise alternate VM capability determinations that can be used to determine a number, type and location of user code instrumentations for the exemplary method 100.

In the exemplary method 100 of FIG. 1, at 108, the user script code is executed in the runtime environment. For example, where a user has written user script code to be run as a macro in a host application, the user script code can be sent to the runtime environment where a just-in-time compilation service (JIT) can compile the code into machine code during execution of the code. In this example, the user script code is compiled in sequence immediately prior to execution. Therefore, during JIT compilation, portions of the code may be compiled and executed while other portions remain uncompiled, for example. In this way, in one embodiment, unexecuted functions in the user script code can be transformed prior to execution.

At 110, a user script code function can be transformed into debuggable script code beginning at a stopping point of an explicit debugging gesture in the function of the user script code if an explicit debugging gesture is detected. For example, during JIT execution of the user script code in the runtime environment a guard that has been instrumented into the user script code may detects an explicit debugging gesture. In this example, the function in the user script code can be transformed into debuggable script code (e.g., instrumenting debugging features into the code to support debugging of the script) beginning at a point where the explicit debugging gesture was detected (e.g., by an injected guard).

Having transformed the user script code into debuggable script code, the exemplary method 100 ends at 112.

In one aspect, the user script code can be instrumented prior to execution in a runtime environment, based on a VM's capabilities. In one embodiment, guards can be injected into the user code, which may be used for detecting an explicit debugging gesture. In this embodiment, for example, the guards can be used to detect explicit debugging gestures during execution of the script and to mark locations in the code where the script can be transformed into debuggable script.

In another embodiment, in this aspect, functions in the user script code can be transformed by splitting a function into a separate function header and function body. These transformations can be performed on the user script code prior to execution of the code in the runtime environment, for example, to facilitate later debugging of the user script code during execution in the runtime environment.

In this embodiment, for example, splitting user functions into their headers and bodies may have merely a slight impact on the code's execution efficiency. However, determination of whether functions are to be split can be based on a VM's capabilities. As described above, capabilities of a VM may affect execution efficiency of a user script code executed in a runtime environment for a host application. Therefore, a decision to transform the user script code by splitting function headers and bodies can be made, for example, based on one or more VM capabilities, such as a functional call speed and debugging support features offered.

Figure 2:
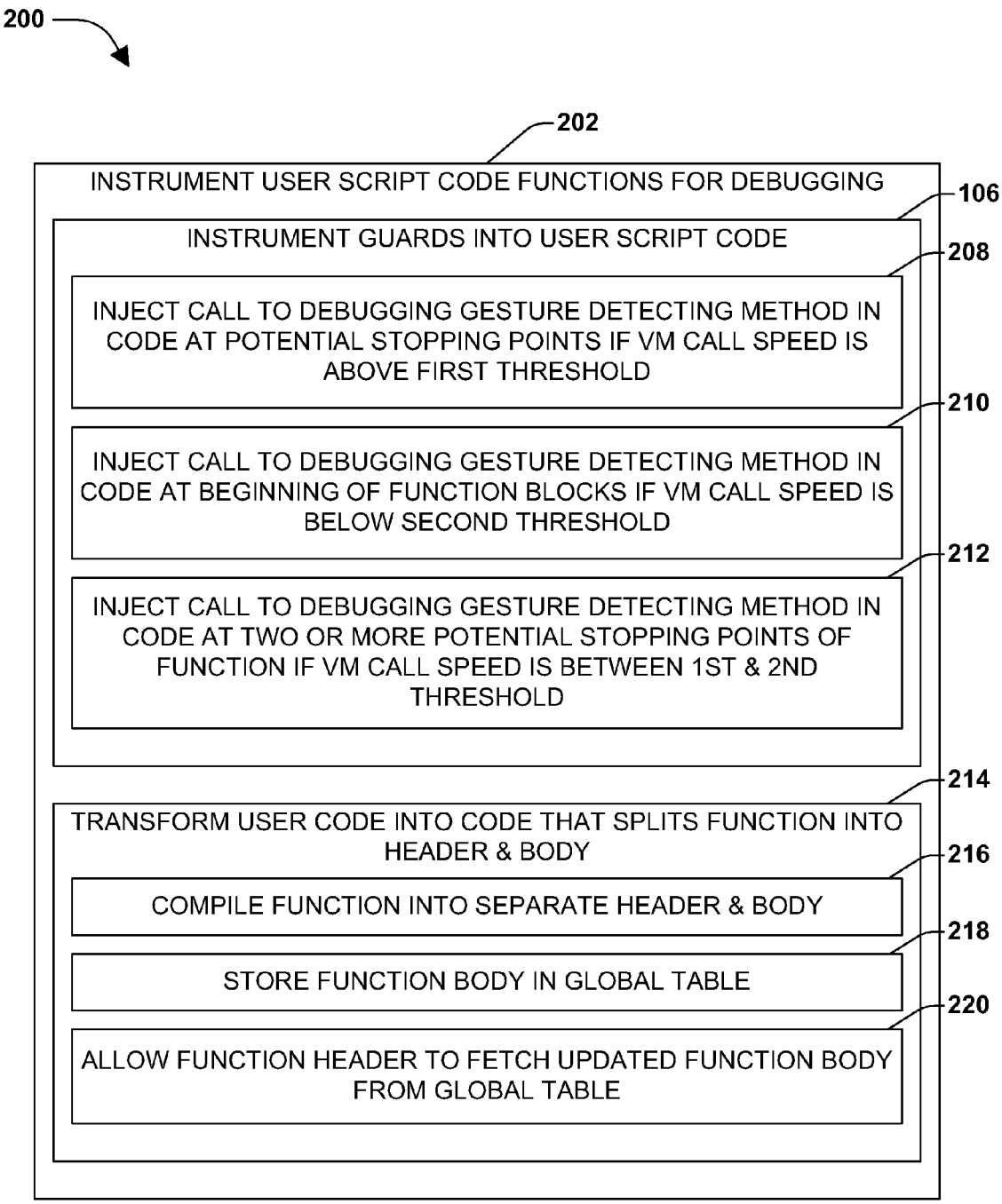
FIG. 2 is a block diagram illustrating one exemplary embodiment of a portion of the techniques described herein.

FIG. 2 is a block diagram illustrating one embodiment 200 of a portion of the exemplary method 100, whereby the user script code can be instrumented prior to execution in the runtime environment 202. Instrumenting the user script code can comprise instrumenting guards for an explicit debugging gesture detecting into the script for respective functions, based on the VM's capabilities, as described in 106 of FIG. 1. In this embodiment, at 208, if the VM's functional call speed is above a first threshold a call to a debugging gesture detecting method can be injected at respective locations in the script where a debugging stop operation may be set.

For example, where injecting calls into the user script has little effect on an execution efficiency of the user code, based on the VM's fast call capability (e.g., above a threshold), more calls can be injected. Therefore, in this example, a call to a debugging gesture detecting method can be injected at respective potential debugging stop operation locations (e.g., before a function and before and after a statement in a function). In this way, in this example, more code may be able to be covered during debugging, while an impact to the execution efficiency of the user script code is limited.

At 210, in the example embodiment 200, if the VM's functional call speed is below a second threshold a call to a debugging gesture detecting method can be injected merely at a beginning of respective function blocks. For example, if the VM's functional call speed is slow (e.g., below a threshold), injecting a lot of calls may have an impact on the execution efficiency of the script code. Therefore, in this example, a call to a debugging gesture detecting method can be injected merely at a beginning (e.g., before the header) of respective functions in the user script. In this way, in this example, execution efficiency may be impact less, while the user script code can still have some coverage for debugging.

At 212, in the example embodiment 200, if the VM's functional call speed is between the first and second thresholds, a call to a debugging gesture detecting method can be injected at two or more potential debugging stopping operations for respective functions. As described above, a function in the user script code may comprise more than one potential location for a debugging stopping operation (e.g., a breakpoint).

In one embodiment, for example, it may be determined that the VM has a functional call speed capability somewhere between a high threshold and a low threshold. In this embodiment, in order to mitigate an impact to the execution efficiency of the user script code, one may wish to merely inject a number of calls to a debugging gesture detecting method that give greater code coverage for debugging, while mitigating an impact to the execution efficiency of the code. Therefore, for example, a call may be injected at a beginning of respective functions and one or more additional calls may be injected at potential debugging stopping points in respective function blocks, based on the VM capabilities.

In this aspect, a greater number of guards injected into the user script code may provide for improved debugging experience for a user. However, injecting guards into the user script code can potentially degrade an execution efficiency of the user script code. In one embodiment, a goal of the guard instrumentation process can be to maintain a desired level of debugging experience for a user (e.g., having a lower level of debugging coverage), while maintaining a desired level of execution efficiency for the user script code (e.g., having a threshold level for execution of code).

It will be appreciated that, while the above embodiments describe utilizing thresholds of a VM's functional call speed to determine a number and location of code injections for the user script code, the techniques and systems described herein are not limited to these embodiments. Those skilled in the art may devise alternate techniques for determining a number and location of code injections. For example, other VM capability factors may be used, such as debugging support features of the VM, and the VM's system capabilities. Further, a functional call speed and/or a combination of several capabilities may be used to determine an appropriate amount and location of instrumentation of the user script code. Additionally, one may partition a script code function into basic blocks, for example, where respective blocks comprise basic statements in the function, then insert a guard in respective basic blocks.

At 214, of the exemplary embodiment 200, the user script code can be transformed into script code that splits a function into a function header and a function body. As described above, splitting a function into a separate header and body can facilitate debugging of the user script code, and may have limited impact on the execution efficiency of the code in the runtime environment.

In this embodiment, splitting a function into a separate header and body comprise compiling a function into a separate header and body, at 216, and storing the function body in a global table, at 218. For example, the user script code may be transformed so that there is a function describing the header and a function describing the body, and code that links the function header and function body in a global table for the user script code.

In this way, in one embodiment, the function body may be updated separately from the header, for example, to instrument debugging features. At 220, because the function body and function header are linked by the global table, the function header can fetch an updated function body using the global table link.

In one aspect, guards injected into the user script code can be used to detect an explicit debugging gesture and mark a location for script transformation, as described above. Debugging of user script code that has been written to be executed in a host application is typically available on demand in an application development and execution framework's runtime environment, and host applications that support these user script codes typically have attached debuggers. However, an explicit gesture is typically needed (e.g., from a user) to drop into debugging mode for the user script code. Explicit debugging gestures may include, for example, opening an IDE to set up a breakpoint in the script, requesting an asynchronous break in a long-running macro, explicitly opening a debugger, and having a synchronous exception thrown that opens an exception dialog then requesting the debugger (e.g., as opposed to aborting).

In this aspect, in one embodiment, explicit debugging gestures may comprise synchronous fault points, which can cause a stopping operation in a user script code during a normal flow of the script, such as a breakpoint inserted in the script for debugging, or an exception thrown in the script. Further, in this embodiment, explicit debugging gestures may comprise asynchronous fault points, which may cause a stopping operation outside of the normal flow of the script, such as requesting an asynchronous break in a long running macro, or explicitly opening the debugger.

In this embodiment, when the user script code is stopped at a synchronous fault point, such as when an exception is thrown by an event that triggers JIT debugging, a thread executing the script should not be allowed to slip past the fault point (e.g., the event that triggered the exception). In this way, for example, transformation of the user script code into debuggable script code can be performed on the script that raised the exception. In this example, this may allow a user to debug merely that area of the code that caused an exception to be raised.

In another embodiment, when user script code is stopped at an asynchronous fault point, such as when a user request an asynchronous break in the script, the thread executing the script can be allowed to slip to a next guard in the script. In this embodiment, the guards are instrumentations, injected into the user script code prior to executing the script in a runtime environment, for detecting an explicit debugging gesture. In this way, in this embodiment, transformation of the user script code to debuggable code can begin at a location of the next guard encountered in the script, for example.

In another aspect, the guards are injected into the user script code prior to executing in a runtime environment in order to detect an explicit debugging gesture and provide a stopping point in the script for transformation of the user script code into debuggable script code. In one embodiment, a guard is merely a hook that leads to a synchronous fault point in the script code. An implementation of a guard can depend on a VM's capabilities, such as services that exposed by the VM (e.g., services that may support debugging).

In one embodiment a use of a guard may comprise injecting a detour at a desired location in a user script code function. For example, operation codes (opcodes) for JIT compiled user script code can be rewritten so that a call to a traceback method can be injected at the desired location. In this example, during execution the traceback method can detect whether a stopping operation has occurred (e.g., a breakpoint) and park the thread in the traceback method, providing a stopping point for later transformation of the code, if desired.

In another embodiment, a high-level language compiler in the application execution and development framework can inject calls to traceback methods. These tracebacks can be activated during JIT compilation, for example, and used to detect explicit debugging gestures and provide marking points for later script transformation, if desired.

In another embodiment, some application development and execution frameworks utilize a runtime environment that executes script code with a dynamic call binder (e.g., Microsoft® Dynamic Language Runtime (DLR)). In this embodiment, a debugger may be able to transform a function in the user script code to debuggable code by rebinding its dynamic callsites to traceback hooks. As an example, this rebinding of dynamic callsites may be used to inject traceback hooks at respective dynamic callsites. Therefore, in this example, a debugger infrastructure can make respective breakpoint locations "hookable" by leverage site rebinding and, if needed, add explicit hooks for breakpoint location in the user script code that may be missing a dynamic callsite.

It will be appreciated that the techniques and systems, described herein, are not limited to the embodiments of guards described above. The guards are devised to detect potential explicit debugging gestures and mark locations for transforming user script code into debuggable code. Those skilled in the art may devise alternate guards in user script code for detecting explicit debugging gestures and marking transformation locations. These alternate means are anticipated by the techniques and systems described herein.

In another aspect, if an explicit debugging gesture is detected the user script code can be transformed into debuggable script code beginning at a stopping point in the user script code, where the explicit debugging gesture occurred. For example, the user script code may be executed without an explicit debugging gesture being detected (e.g., no exceptions are thrown, and no breakpoints are set up). In this example, the user script code may be executed efficiently in the runtime environment. However, as another example, if an explicit debugging gesture is detected, the user script code can be transformed to debuggable script. In this way, in this example, the user script code may merely be transformed when debugging is requested, thereby allowing the user to determine when to impact execution efficiency of the user script code.

Figure 3:
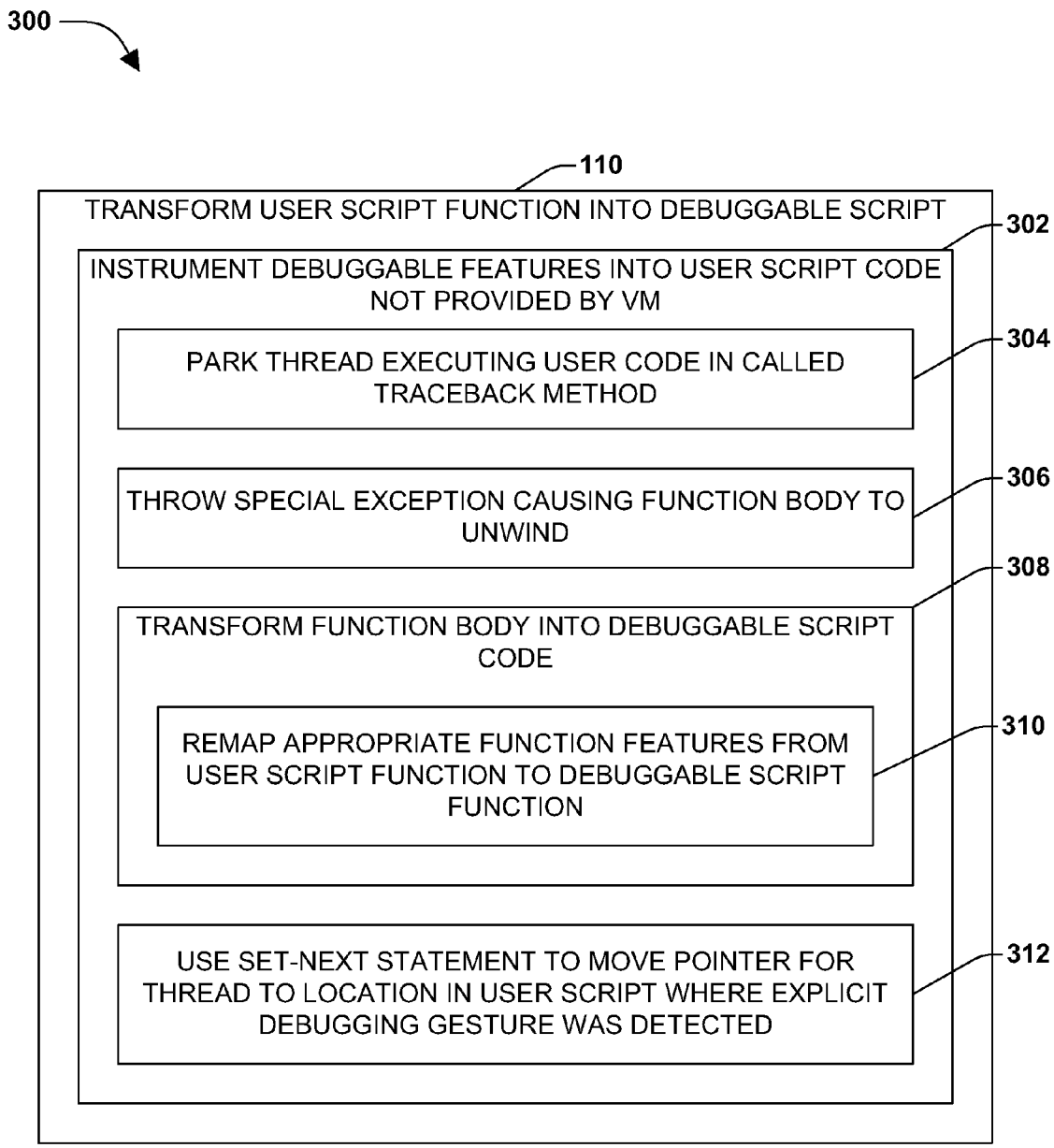
FIG. 3 is a block diagram illustrating one exemplary embodiment of a portion of the techniques described herein.

FIG. 3 is a block diagram illustrating one embodiment 300 of a portion of the exemplary method 100, whereby the user script code can be transformed into debuggable script code 110. As an example, during JIT compilation of user script code in a runtime environment for a host application an explicit debugging gesture may be detected. In this example, one can use the JIT compilation service to transform one or more portions of the user script code into debuggable code 110.

At 302, merely those debuggable features that are not provided for by the VM, used for the host application in the runtime environment, can be instrumented into the user script code. In one embodiment, a VM may provide some services and/or support operating system (OS) services that support debugging of the user script code. For example, a VM may provide a service that allows a debugger to look at local variables in the user script code. Therefore, in this example, hooks for dealing with local variables may not need to be instrumented into the user script code for debugging, as a user can utilize the VM to collect variables for debugging.

In another embodiment, transformation of the user script code can comprise merely instrumenting those debugging features that are enabled by the explicit debugging gesture. For example, a user may merely stop at a breakpoint in a function then resume the script. In this example, if the user does not wish to perform stepping, an edit-and-continue, or other debugging features, then a transform can be injecting a call to a traceback method for parking the thread at the breakpoint. In this embodiment, adding debugging features to the script code that may not be used by a user during debugging, for example, may decrease execution efficiency without adding to a user's debugging experience. Therefore, the number and type of debugging features instrumented into the user script code when it's being transformed into debuggable code can be determined by a type of explicit debugging gesture detected (e.g., debugging is not set up if it is not needed).

In this exemplary embodiment 300, instrumenting debuggable features into the user script code comprises parking a thread that is executing the user script code in a called traceback method, at 304. For example, if a call to a traceback method is used as a guard (e.g., that was injected prior to execution by the JIT), the traceback can be used to park the thread to allow for transformation of the function.

At 306, a special exception can be thrown that causes the user script code function body to unwind. For example, when the explicit debugging gesture is detected, the called method may throw a special exception to unwind the body of the function to prepare for transformation of the function body. At 308, the function body of the user script code can be transformed into debuggable script code. For example, the transformation may include instrumenting the user script code with debugging features that can be used by a debugger, but allow the user code to continue operating in the host application during debugging.

In this exemplary embodiment 300, transforming the function body into debuggable script code comprises remapping appropriate function features from the user script code function to the debuggable script code function, at 310. For example, if a function in the user script code is to be transformed into different code, one may wish to map certain elements of the original function, such as instructions, local variables and their states, and body elements, among other things. In this way, in this example, the debuggable script code can be executed in a manner that sufficiently similar to the user script code so that a user may not discern a difference.

Having transformed the function body of the user script code into debuggable code, a "set-next" statement can be used to move the pointer for the thread back to a location in the user script code where the explicit debugging gesture was detected, at 312. In one embodiment, for example, moving the thread pointer back to the place where the debugging gestures was detected (e.g., an exception, a breakpoint), the script code can be executed with the recently instrumented debugging features. In another embodiment, the debug instrumentation could support "set-next" statements by injecting a switch table at a start of the function body, which jumps to respective possible statements in the function body, for example. In this way, in this example, a user can perform debugging operations on the script code from the point of the explicit debugging gesture.

It will be appreciated that, while the embodiments described above describe transforming merely a function (or a portion thereof) of the user script code where a debugging gesture was detected, the techniques described herein can be used to transform respective functions in the user script code. Further, selective functions (or portions thereof) may be transformed based on where and what type of explicit debugging gestures were detected. Additionally, a remainder of unexecuted user script code can be transformed from the point of the detected gesture where a JIT compilation service is used to compile and executed the script during execution in the runtime environment.

In another aspect, the user script code gets transformed into script code that provides debugging support for the script code for a debugger used in the runtime environment of the host application. In one embodiment, for example, the user script code can be instrumented with script code that can make the user script code debuggable, allowing the debugger to get debugging information from the user code instead of from a debugging API that may impact the host application.

Typically, debuggers provide for a variety of debugging services for script code, such as set-next, variable inspection, edit and continue, stepping operations, calstack maintenance, exception handling, and others. In this embodiment, these features can be instrumented into the user script code by transforming the code into debuggable code so that debugging information is pulled from the script instead of the system, for example.

Further, in one embodiment, calls to traceback methods injected into the user script code can allow the script code to continue operating in the host application, instead of being frozen by the debugger. For example, a traceback method can call back into the host application, to allow the host application to continue to respond to user interface requests. In this embodiment, these calls to traceback methods can be instrumented into the user script code with the debuggable feature transforms to allow for an appearance of continued host application operation during debugging, for example.

Figure 4:
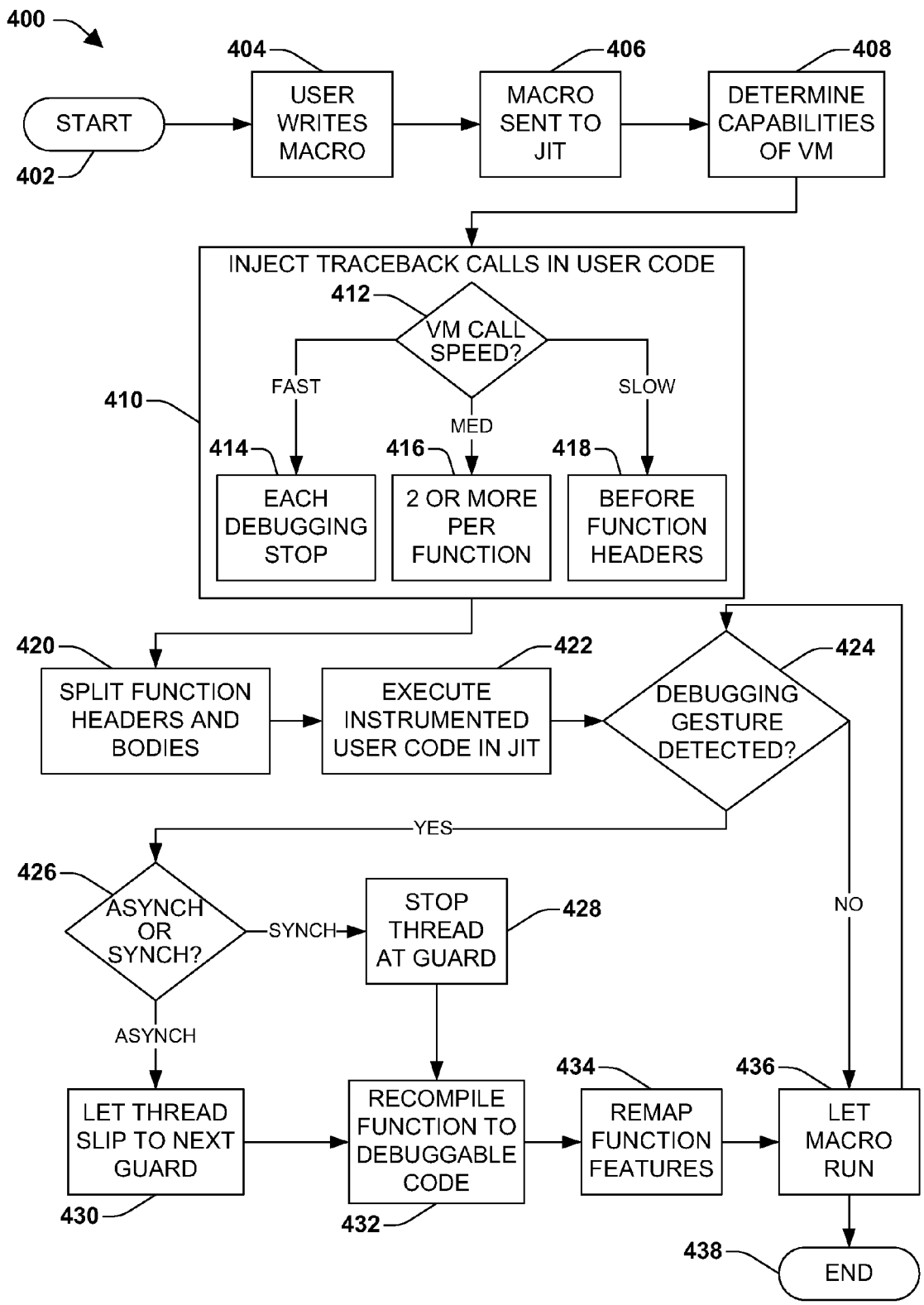
FIG. 4 is a flow diagram illustrating one exemplary embodiment of using the techniques and systems described herein to remap user script code, developed to be run in a host application, to debuggable script code.

FIG. 4 is a flow diagram illustrating one embodiment 400 of using the techniques described above for remapping user script code to debuggable script code, based on whether a debugging gesture is detected. The exemplary embodiment 400 begins at 402, where a user may write a macro to be executed in a host application, at 404. The macro can be sent to a runtime environment that utilizes a JIT compilation service for compilation of the macro during execution of the code, at 406.

At 408, capabilities of a VM that is utilized in the runtime environment for the host application can be determined, for example, to identify its functional call speed and debugging support services provided. At 410, calls to traceback methods can be injected into the user script code, based on the VM capabilities. If the VM has a fast functional call speed 412, the traceback calls can be injected at respective potential stopping operation locations in the user script code 414. As an example, calls may be injected at a beginning of a function block, and before and after respective statements in the function. If the VM has a slow functional call speed 412, the traceback calls can be injected merely before respective functions in the user script code 418. Further, if the VM has a medium functional call speed 412, two or more traceback calls can be injected in respective functions 416 (e.g., at the beginning and in the body depending on VM functional call speed).

At 420, respective functions in the user script code can be split into a function header and a function body. As described above, the function header and body can be linked by a global table, for example, so that a function header may later retrieve a function body even it has been updated. At 422, the instrumented code can be executed in the runtime environment.

At 424, if the code is compiled and executed by the JIT compilation service and no explicit gestures are detected, the macro is allowed to run to completion, at 436, and no transformation of the user script code may be needed. However, if an explicit debugging gesture is detected 424 during execution, one determines whether the debugging gesture is an asynchronous fault point or a synchronous fault point, at 426. If the gesture is a synchronous fault point, such as an exception thrown or a breakpoint inserted for debugging, the thread is stopped at the point of the call to the traceback method (guard), at 428. If the gesture is an asynchronous fault point, such as an asynchronous break inserted or an explicit opening of a debugger, the thread is allowed to slip to a next guard encountered in the user script code, at 430.

At 432, at a point where the user script code has been stopped (e.g., where the thread has been parked by the traceback method), a function in the user script code (or portion thereof) is transformed into debuggable script code. At 434, the appropriate function features are remapped from the user script code function to the debuggable script code function, as described above; and the macro is allowed to continue to run, at 436. If another debugging gesture is detected, at 424, the user script code can be remapped again to debuggable script code until completed, at 438.

It will be appreciated that a user may perform debugging of the script code at a point where the user script code has been transformed into debuggable code. Once the user has completed debugging the script code, the macro can be continued by the user, or aborted. The actual debugging of the script code is not illustrated in the above figure, although it is anticipated that debugging may occur.

Figure 5:
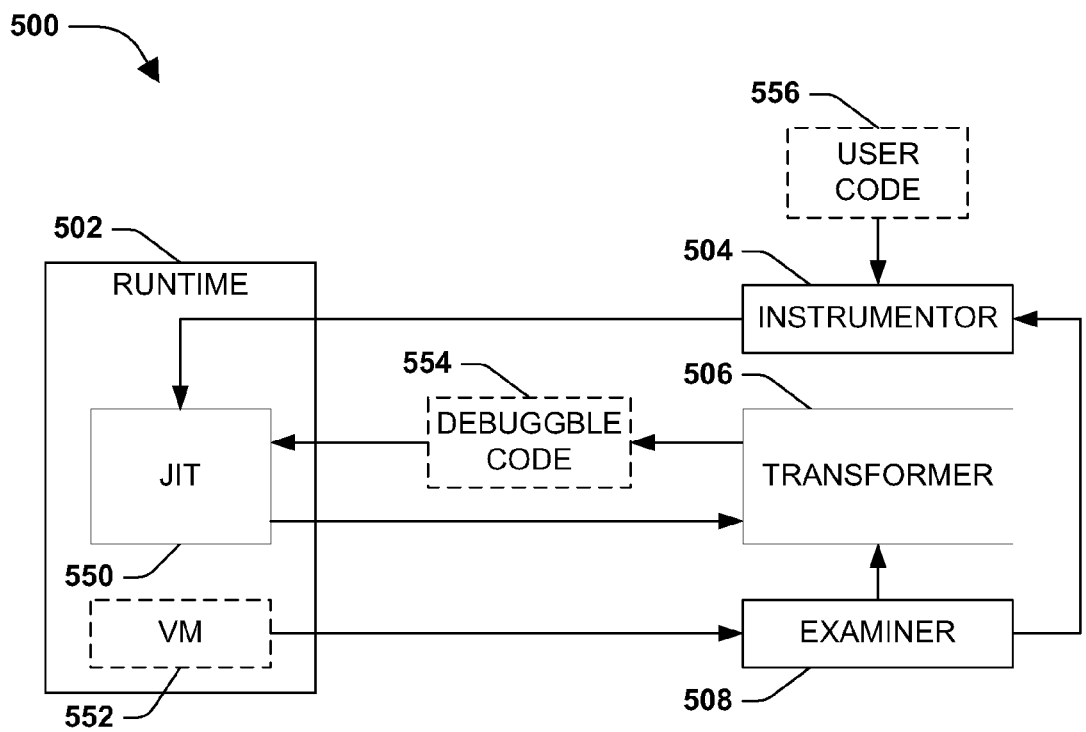
FIG. 5 is a component block diagram illustrating an exemplary system for remapping user script code, developed to be run in a host application, to debuggable script code.

A system may be devised that transforms user script code 556 into debuggable script code 554 based on one or more explicit debugging gestures, for example, to provide for debugging coverage of the user script code while providing for efficient execution of the user script code in a runtime environment. FIG. 5 is a component block diagram of an exemplary system 500, for remapping user script code, developed to be run in a host application, to debuggable script code. For example, if a user develops script code 556 that can be run as a macro in a host application, the exemplary system 500 may be used to transform the user script code 556 into debuggable code 554 based on explicit debugging gestures from the user.

The exemplary system 500 comprises a virtual machine (VM) examining component 508, which can be configured to determine capabilities of a VM 552 that is utilized for executing the host application in a runtime environment 502 of an application execution and development framework. For example, application VMs may be used in the runtime environment 502 to support execution of the host application. However, different application VMs may have different capabilities, such as functional call speed and debugging support services. Therefore, the VM examining component 508 can be used to determine the capabilities of the VM that is being used for the host application.

The exemplary system 500 further comprises a guard instrumentation component 504, operably coupled to the VM examining component 508, and configured to instrument respective functions in the user script code 556 with one or more guards for detecting an explicit debugging gesture, based on the VM's capabilities. For example, a functional call speed of the VM 552 can be determined by the VM examining component 508, and the guard instrumentation component 504 can inject a number of guards into certain locations in the user script code 556 based on the functional call speed of the VM 552. In this example, a faster functional call speed may allow the guard instrumentation component 504 to inject more guards at more locations in the user script code 556.

In one embodiment, the guards injected by the guard instrumentation component 504 may comprise a call to a traceback method, which can be configured to park a thread that is executing the user script code until a debugger allows the user script code to continue execution. In this way, for example, when an explicit debugging gesture is detected the parked thread can mark a location where transformation of the user script code can begin.

The exemplary system 500 further comprises the runtime environment 502 configured to support just-in-time compilation and execution 550 of the user script code 556. For example, after the user code 556 has been instrumented with guards by the guard instrumentation component 504, the instrumented code can be sent to the runtime environment 502 for execution by the JIT 550. In this example, the JIT can compile the user script code into machine language and execute it in the sequence of the script.

The exemplary system 500 further comprises a script code transforming component 506, operably coupled to the runtime environment 502, and configured to transform a user script code function into debuggable script code 554 beginning at a stopping point of an explicit debugging gesture in the function of the user script code if an explicit debugging gesture is detected. For example, if an explicit debugging gesture is detected during JIT compilation and execution 550 the script code transforming component 506 transform a user script code function where the debugging gesture was detected into debuggable script code 554. In this example, the debuggable script code can be sent back to the JIT 550 to be recompiled and executed in the runtime environment 502 with the remaining script code.

In one embodiment, the script code transforming component 506 can be comprised in the compiler in the runtime environment, and configured to recompile the user script code into debuggable script code during execution of the user script code. For example, the JIT compilation service may comprise the transformation component 506 so that when a debugging gesture is detected, the user script code can be recompiled into debuggable script and executed by the JIT 550.

In another embodiment, the script code transforming component 506 can comprise a debugging feature determination component, which may be configured to determine the one or more debugging features to be instrumented into the user script code during transformation based on the one or more explicit debugging gestures detected. For example, if a user initiates a breakpoint in the user script code during execution, then steps through the code to inspect variables, the debugging feature determination component can determine that these are the features that a user wishes to be instrumented into the user script code during transformation into debuggable script code.

In another embodiment, the exemplary system can comprise a function splitting component configured to transform the user script code into script code that splits a function into a function header and a function body prior to execution in the runtime environment. In this embodiment, for example, the function splitting component can link the function header and function body in a global table. In this example, if a function body is modified by a transformation, the function header can later request the function body using the global table.

Figure 6:
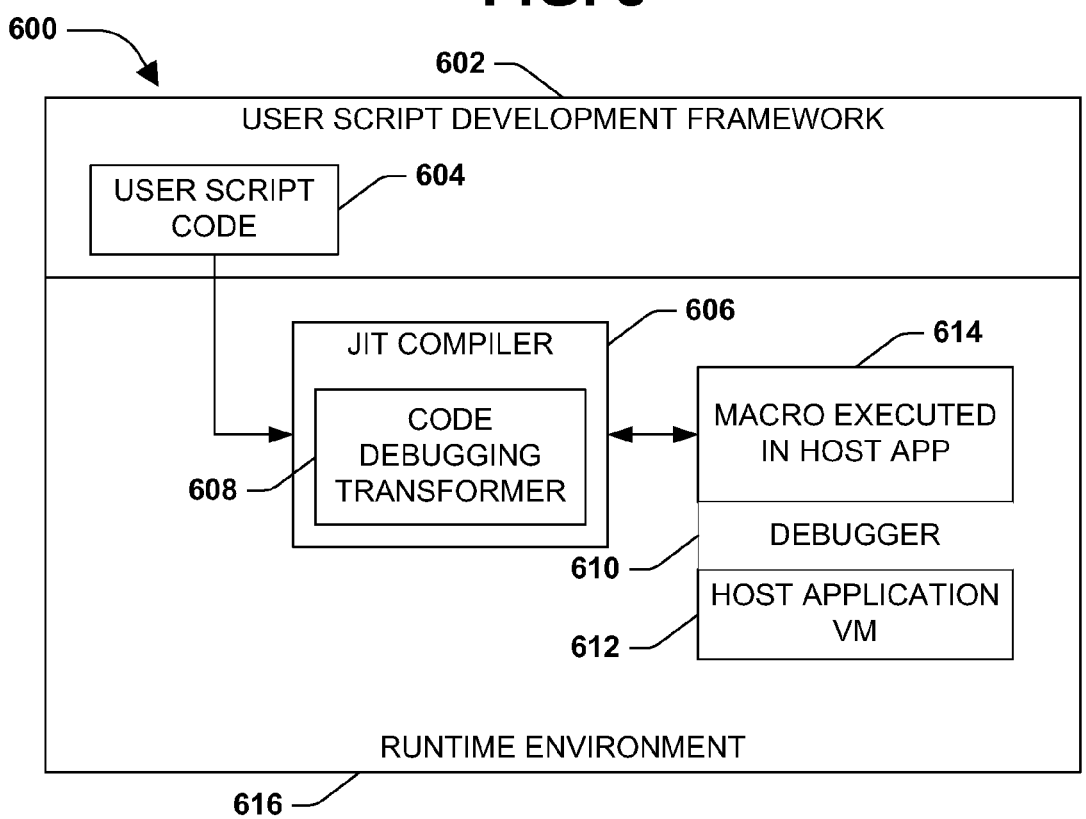
FIG. 6 is an illustration of one embodiment of an example implementation of the exemplary systems described herein.

FIG. 6 is an illustration of one embodiment 600 of an example implementation of the exemplary systems described above. A user script development framework 602, such as an application execution and development framework may be used to develop user script code 604 to be run in a host application (e.g., as a macro).

The user script code can be compiled from a high-level language to an intermediate language for the framework 602, and sent to the runtime environment 616. The runtime environment 616 may be configured to execute the host application and user script code, and comprises the just-in-time compilation service 606 (JIT). The JIT compilation service 606 is used to compile and execute the user script code during execution of the code.

In this exemplary embodiment 600, a user script transformation system 608, as described above, is comprised within (or may be operably coupled with) the JIT compiler 606. In this way, for example, as the user code is executed in the runtime environment, explicit debugging gestures may be detected, such as when a user activates the debugger 610, or the debugger is activated by an exception in the user script code. Because the JIT 606 compiles code as it is executed, the execution thread may be parked in a traceback method while the transformation component recompiles the user script code into debuggable code, based on the debugging gesture(s) detected.

Further, the host application VM 612 can be comprised in the runtime environment, so its capabilities can be determined for user code instrumentation prior to compilation by the JIT 606. In this way, user script code can be compiled, executed, and recompiled into debuggable code on-the-fly, for example, using the runtime environment 616 and the JIT compiler 606 for the user script code transformation system.

Figure 7:
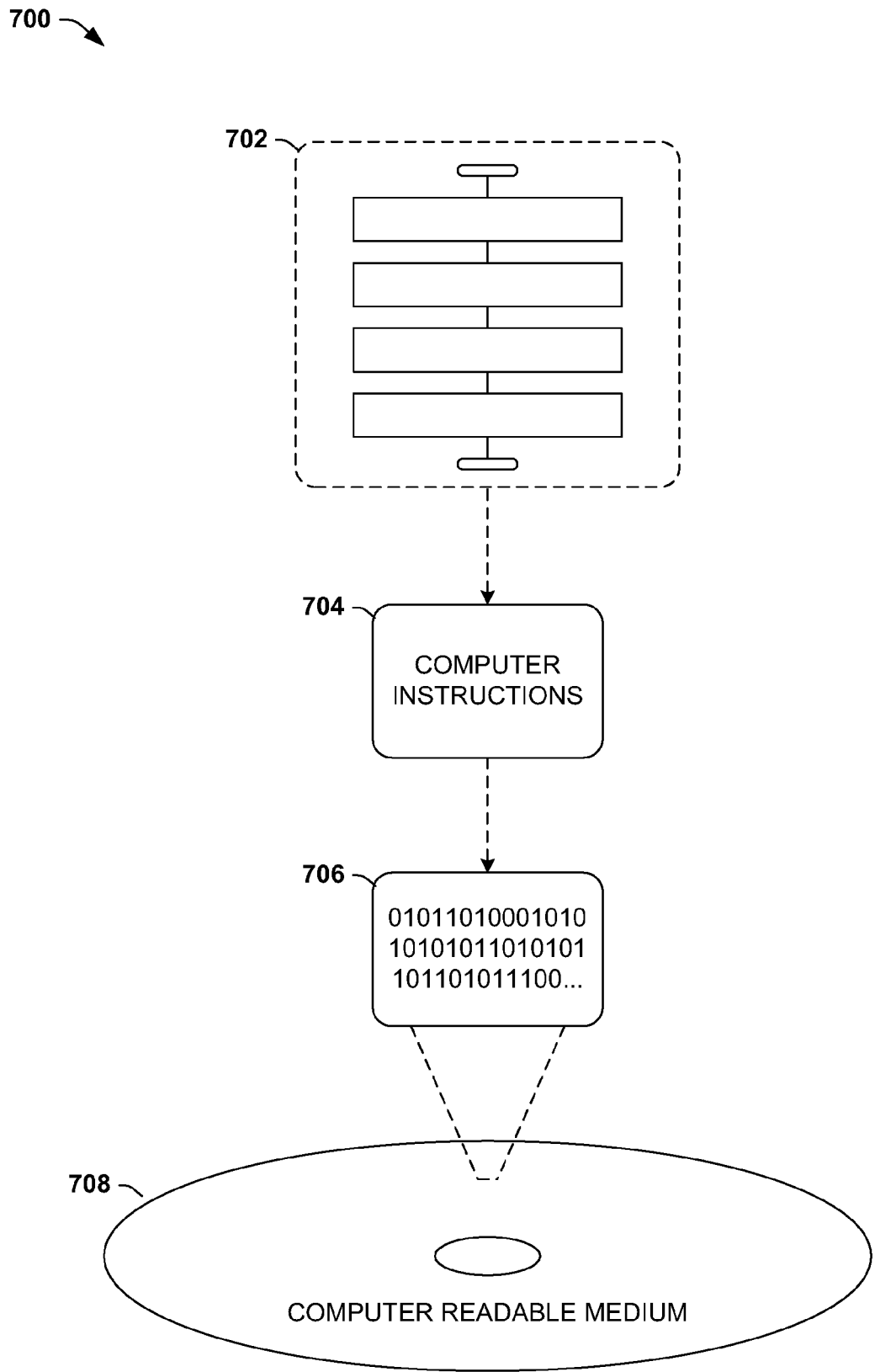
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 100 of FIG. 1, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
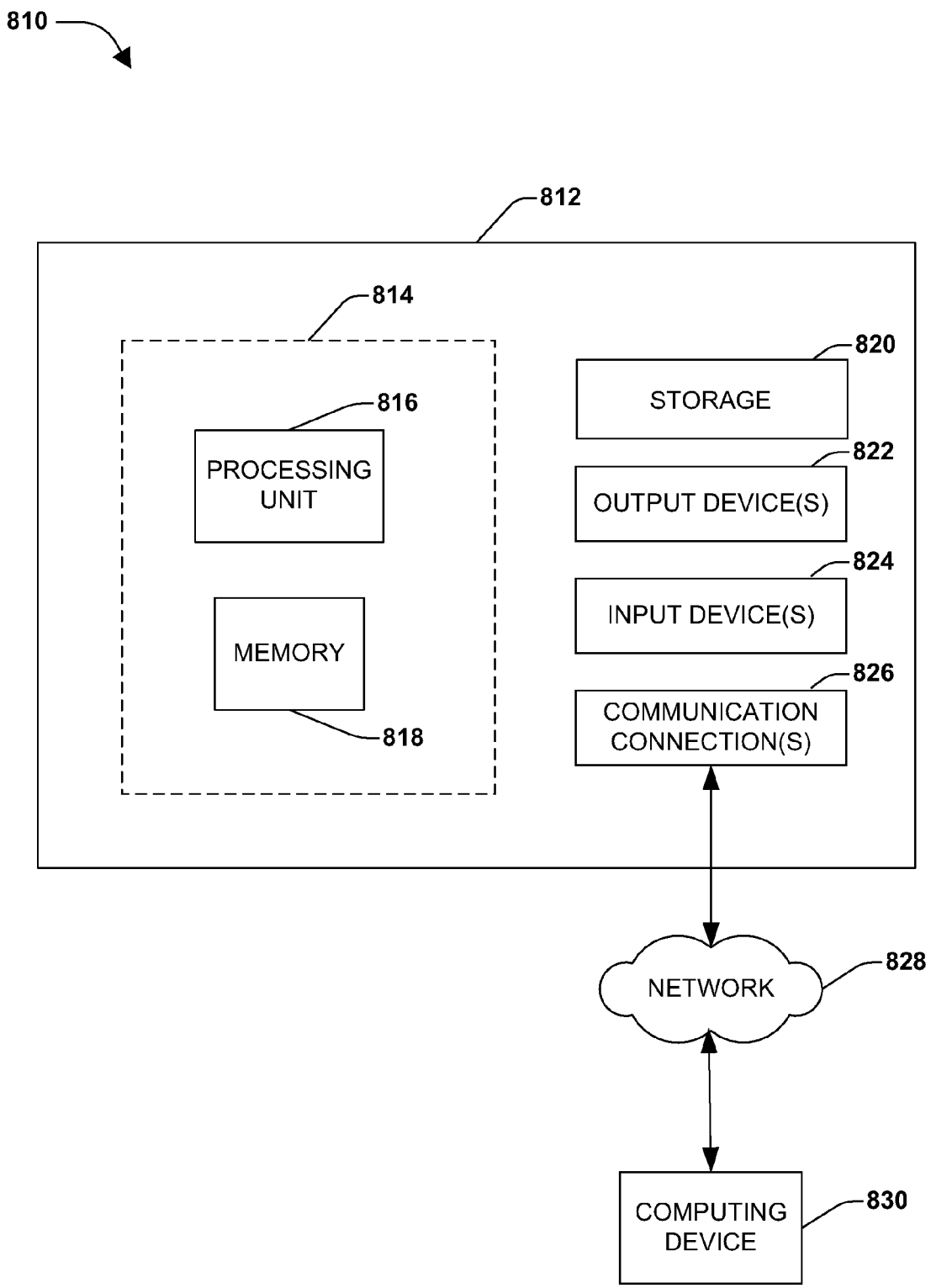
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for remapping user script code, developed to be run in a host application, to debuggable script code, comprising:
   determining one or more capabilities of a virtual machine (VM) that is utilized for executing the host application in a runtime environment of an application execution and development framework;
   instrumenting a function in the user script code with one or more guards based on at least one of the one or more capabilities of the VM, the instrumenting comprising at least one of:
      instrumenting a first guard into the user script code at a first location associated with a first potential debugging stopping operation based on at least one of the one or more capabilities of the VM;
      instrumenting a second guard into the user script code at a second location associated with a second potential debugging stopping operation if a functional call speed capability of the VM is above a first threshold;
      instrumenting a third guard into the user script code at a third location associated with a beginning of the function if the functional call speed capability of the VM is below a second threshold; and
      instrumenting a fourth guard into the user script code at a fourth location associated with a third potential debugging stopping operation and a fifth guard into the user script code at a fifth location associated with a fourth potential debugging stopping operation if the functional call speed capability of the VM is between the first threshold and the second threshold;
   executing the user script code in the runtime environment; and
   responsive to detecting an explicit debugging gesture using at least one of the one or more guards, transforming the function to generate debuggable script code, at least some of the method implemented at least in part via a processing unit.

2. The method of claim 1, comprising splitting the function into a function header and a function body.

3. The method of claim 2, comprising storing the function body in a global table.

4. The method of claim 3, comprising allowing the function header to fetch an updated function body from the global table.

5. The method of claim 1, comprising instrumenting merely one or more debuggable features not provided by the VM into the user script code.

6. The method of claim 1, comprising instrumenting into the user script code merely one or more debuggable features that correspond to one or more debugging features enabled by the explicit debugging gesture.

7. The method of claim 1, comprising remapping one or more function features associated with the function.

8. The method of claim 7, the remapping comprising remapping at least one of the one or more function features to a debuggable script code function.

9. The method of claim 1, the explicit debugging gesture associated with at least one of:
   setting up an asynchronous breakpoint in the user script code;
   activating a debugger for the user script code; and
   an exception occurring during the execution of the user script code.

10. The method of claim 1, comprising injecting one or more calls to a method for detecting the explicit debugging gesture.

11. The method of claim 1, comprising transforming remaining unexecuted user script code into debuggable script code beginning at a point associated with a second explicit debugging gesture of the user script code.

12. The method of claim 1, comprising allowing a thread executing the user script code to slip to a next guard in the user script code if an asynchronous breakpoint is detected.

13. The method of claim 1, comprising responsive to detecting the explicit debugging gesture, parking a thread that is executing the user script code with a called traceback method.

14. A system for remapping user script code, developed to be run in a host application, to debuggable script code, comprising:
   a determination component configured to determine one or more capabilities of a virtual machine (VM) that is utilized for executing the host application in a runtime environment of an application execution and development framework;

an instrumentation component configured to instrument a function in the user script code with one or more guards based on at least one of the one or more capabilities of the VM, the instrumentation component configured to at least one of:

instrument a first guard into the user script code at a first location associated with a first potential debugging stopping operation based on at least one of the one or more capabilities of the VM;

instrument a second guard into the user script code at a second location associated with a second potential debugging stopping operation if a functional call speed capability of the VM is above a first threshold;

instrument a third guard into the user script code at a third location associated with a beginning of the function if the functional call speed capability of the VM is below a second threshold; and instrument a fourth guard into the user script code at a fourth location associated with a third potential debugging stopping operation and a fifth guard into the user script code at a fifth location associated with a fourth potential debugging stopping operation if the functional call speed capability of the VM is between the first threshold and the second threshold;

an execution component configured to execute the user script code in the runtime environment; and a transformation component configured to, responsive to detecting an explicit debugging gesture using at least one of the one or more guards, transform the function to generate debuggable script code, at least some of the system implemented at least in part via a processing unit.

15. The system of claim 14, comprising a function splitting component configured to split the function into a function header and a function body.

16. The system of claim 14, at least one of the one or more guards associated with a call to a traceback method configured to park a thread that is executing the user script code until a debugger allows the user script code to continue execution.

17. The system of claim 14, the transformation component comprised in a compiler in the runtime environment.

18. The system of claim 14, the one or more capabilities of the VM comprising at least one of:

one or more debugging support services provided by the VM; and one or more debugging support services exposed by the VM.

19. A tangible computer readable storage device storing instructions that when executed perform a method for remapping user script code, developed to be run in a host application, to debuggable script code, comprising:

determining one or more capabilities of a virtual machine (VM) that is utilized for executing the host application in a runtime environment of an application execution and development framework;

instrumenting a function in the user script code with one or more guards based on at least one of the one or more capabilities of the VM, the instrumenting comprising at least one of:

instrumenting a first guard into the user script code at a first location associated with a first potential debugging stopping operation based on at least one of the one or more capabilities of the VM;

instrumenting a second guard into the user script code at a second location associated with a second potential debugging stopping operation if a functional call speed capability of the VM is above a first threshold;

instrumenting a third guard into the user script code at a third location associated with a beginning of the function if the functional call speed capability of the VM is below a second threshold; and instrumenting a fourth guard into the user script code at a fourth location associated with a third potential debugging stopping operation and a fifth guard into the user script code at a fifth location associated with a fourth potential debugging stopping operation if the functional call speed capability of the VM is between the first threshold and the second threshold;

executing the user script code in the runtime environment; and responsive to detecting an explicit debugging gesture using at least one of the one or more guards, transforming the function to generate debuggable script code.

20. The tangible computer readable storage device of claim 19, the method comprising splitting the function into a function header and a function body.

* * * * *